C. M. Shaw.
Floor Set.
Nº 96,355.  Patented Nov. 2, 1869.
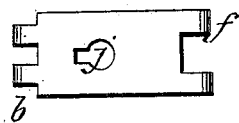
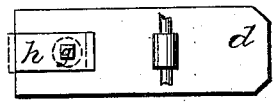
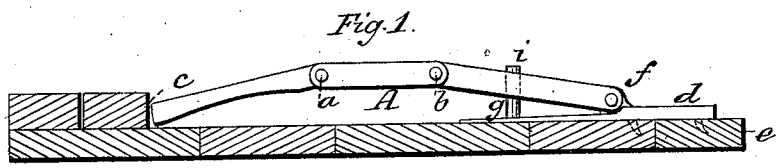
Witnesses:
Henry C. Houston.
Wm Franklin Seavey.
Inventor.
C. M. Shaw
per Wm H. Clifford atty.

United States Patent Office.

CHARLES M. SHAW, OF PORTLAND, MAINE.

Letters Patent No. 96,355, dated November 2, 1869; antedated October 22, 1869.

IMPROVEMENT IN FLOOR-SET.

The Schedule referred to in these Letters Patent and making part of the same.

*To all whom it may concern:*

Be it known that I, CHARLES M. SHAW, of Portland, in the county of Cumberland, and State of Maine, have invented a new and useful Improved Floor-Set; and I hereby declare the following to be a full, clear, and exact description thereof, which will enable others skilled to make and use my invention, reference being had to the accompanying drawings, forming part of this specification, in which—

Figure 1 is a side view of my invention, showing its application to the boards of a floor.

Figure 2 is a top view of the plate $d$, showing the slide $h$.

Figure 3 is a top view of one part of the piece A, showing the slot $j$.

Figure 4 is a side view of a portion of the plate $d$, showing the studs $e$.

When the finished or top flooring of houses is laid, great care is needed to keep the boards thereof as closely pressed together as possible, so that in after time they will not become separated by shrinking.

This is now a matter of time and labor, the boards being driven together and then braced before nailing, and this is done in a rude and imperfect manner, and with any appliance that may be at hand.

My invention relates to a device for effecting this operation more perfectly, more rapidly, and with greater precision.

It consists of a piece, A, in three parts, jointed at $a$ and $b$, so as to form a toggle-joint.

$c$ is the end to press against the edge of the board or piece of flooring.

$d$ is a plate, with studs $e$, to rest on and penetrate the under or first flooring.

This plate or catch $d$ may be made in a variety of forms, and I do not limit myself to the form shown in the drawings of this part of the device. It is, however, pivoted in some way to the end $f$ of the piece A.

$g$ is a pin, attached to slide, $h$, moving in a slot in the upper side of plate $d$.

It has a head, $i$, and passes through a slot, $j$, in the piece A, serving to keep it down when the slide is pushed forward, so as to bring the pin into the narrow part of the slot $j$, and allowing the piece to rise when the slide is drawn back so as to bring the pin into the wide part.

The operation is as follows:

Place the studs on the under flooring, at a distance from the board of the upper flooring to be nailed, less than the length of the device, that is, so that the toggle-joint will be bent upward. Then press with the foot, or in any other convenient way, on the crooked toggle-joint, and the board will be pressed up to its contiguous board with great power, by reason of the pressure of the device exerted in opening the joints. Then slip the pin $g$ forward so as to come into the narrow part of the slot, and the board will be held securely while being nailed.

Two of these devices, or more, if desired, are to be used at the same time, one being placed at each end of the board or piece of flooring. Thus, the setting up of the board is effected surely, quickly, and easily.

What I claim as my invention, and desire to secure by Letters Patent, is—

The floor-set as described, having the different parts herein set forth.

CHARLES M. SHAW.

Witnesses:
HENRY C. HOUSTON,
WM. FRANKLIN SEAVEY.